United States Patent
Zhuang

(10) Patent No.: US 8,289,968 B1
(45) Date of Patent: Oct. 16, 2012

(54) DISTRIBUTED NETWORK ADDRESS TRANSLATION IN COMPUTER NETWORKS

(75) Inventor: Yan Zhuang, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 12/913,498

(22) Filed: Oct. 27, 2010

(51) Int. Cl.
*H04L 12/28* (2006.01)

(52) U.S. Cl. .................. 370/392; 370/252; 370/401

(58) Field of Classification Search .................. None
See application file for complete search history.

(56) References Cited

U.S. PATENT DOCUMENTS

| | | | | |
|---|---|---|---|---|
| 7,280,557 | B1 * | 10/2007 | Biswas et al. | 370/465 |
| 7,542,475 | B2 * | 6/2009 | Bar-Zakai | 370/401 |
| 2005/0076108 | A1 * | 4/2005 | Li et al. | 709/223 |
| 2007/0199062 | A1 * | 8/2007 | Cho | 726/12 |
| 2011/0019677 | A1 * | 1/2011 | Townsley et al. | 370/401 |
| 2011/0047256 | A1 * | 2/2011 | Babu et al. | 709/223 |

OTHER PUBLICATIONS

JUNOS® Software Security Configuration Guide, Release 9.6, Revision 1, Jul. 8, 2009, 1018 pp.
Juniper® Networks, "SRX Series and J Series Network Address Translation: Configuring Next-Generation NAT on Juniper Networks SRX Series Services Gateways and J Series Services Routers," May 2010, 20 pp.

* cited by examiner

*Primary Examiner* — Duc C Ho
(74) *Attorney, Agent, or Firm* — Shumaker & Sieffert, P.A.

(57) ABSTRACT

In general, techniques are described for performing distributed network address translation (NAT) with a network device. The network device includes an interface card and a control unit. The interface card receives a packet including a source address. The control unit includes NAT modules. each of which stores a local pool of unallocated NAT resources that have not yet been allocated for use in performing network address translation. The NAT resources each include a network address and a network port number. One of the NAT modules receives the packet, determines whether any of the NAT resources from the local pool of NAT resources are available, in response to the determination that none of the NAT resources from the local pool of NAT resources are available, requests additional NAT resources, and performs NAT to obscure the source address of the packet using one of the additional NAT resources to generate a modified packet. The interface card forwards the modified packet.

27 Claims, 7 Drawing Sheets

DISTRIBUTED NETWORK ADDRESS TRANSLATION IN COMPUTER NETWORKS

TECHNICAL FIELD

The invention relates to computer networks and, more particularly, to network address translation in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server in each subnet may be responsible for allocating these network addresses in accordance with a network address allocation protocol, such as a dynamic host configuration protocol (DHCP). The network addresses usually identify a general location of the network device to which the network address has been allocated.

Private networks, such as those owned and operated by an enterprise or business, often operate their networks in a manner similar to that described above with respect to large public networks. The private networks generally include a network server responsible for allocating a network address to each of the network devices that operate in the private network. The network server generally assigns these network addresses from a pool of network addresses leased from a service provider that provides the private network with access to the Internet and other public networks. The allocation of these network addresses to individual network devices operating within the private network and subsequent interaction with the public network by these network devices may expose the topology and other information of the private network to the public network. This exposure may represent a security risk as this information may be used by so-called "hackers" to initiate network attacks that target vulnerabilities of the private network learned from this information.

To prevent the topology and other information from being exposed by the private network, the private network often deploys a firewall that implements network address translation (NAT). This firewall may be deployed between the private network and the interface to the public network. The firewall performs NAT on network traffic originating from the network devices of the private network and destined for the public network to replace the network addresses assigned to the network devices of the private network. These so-called source network addresses of the network traffic are usually replaced with a uniform, publically-known network address assigned to the firewall. The firewall allocates a different port number for each network device so as to differentiate return traffic received from the Internet. The firewall replaces the port specified in the network traffic with the port corresponding to the network device that originated the traffic. In this manner, the firewall obscures the network addresses assigned to the various network devices of the private network and prevents the private network from exposing its topology and other information to the public network considering that, from the perspective of the public network, the firewall appears to originate all of the network traffic from the private network.

SUMMARY

In general, techniques are described for performing network address translation (NAT) that improve the speed with which NAT may be performed. A NAT resource, as referred to herein, represents the combination of the network address and port that is used to obscure a source network address within the network traffic. The techniques described in this disclosure internally allocate a pool of NAT resources within a network device for use by one or more NAT software modules executing within that network device. A central NAT management module executing within the network device allocates a pool of NAT resources to each of the NAT software modules, which may be distributed throughout other components of the network device. The NAT modules may then receive packets. Each of these packets includes a new network address, which NAT modules translate using network address translation. To perform network address translation, the NAT modules allocate one of the NAT resources from its respective pre-allocated pool of NAT resources, thereby avoiding the need to issue a request to the central NAT management module in response to receiving each and every packet that requires a NAT resource be allocated. In this respect, batch pre-allocation of NAT resources or, in other words, pre-allocating a pool of NAT resources from the central NAT management module to the NAT modules may improve the speed with which the NAT modules distributed throughout a network device may configure and perform NAT.

Moreover, the techniques in various aspects may better balance the use of NAT resources through a distributed form of NAT resource management. Once each of the NAT modules has received their allocated pool of NAT resources, these various NAT modules may each receive different levels of network traffic. In some instances, a first one of these NAT modules may utilize all of its NAT resources before a second one of these NAT modules. Rather than request another pool of NAT resources to add to its current pool, the first one of the NAT modules may instead requests a NAT resource from the second one of these NAT modules. If this second one of the NAT modules does not have any available NAT resources to allocate to the first one of the NAT modules, the first one of the NAT modules may then request a NAT resources from another one of its peer NAT modules, e.g., a third one of the NAT modules. Considering that these NAT modules are often located in a data plane of the network device while the central NAT module resides in a control plane of the network device, requesting NAT resources from peers located in the same data plane may improve the speed with which NAT resources may be reserved for use in obscuring source network addresses. Moreover, this peer-to-peer form of NAT resource requests may better distribute the NAT resources so that these NAT resources can be more fully utilized.

In one embodiment, a method of allocating network resources for use in network address translation (NAT) is described. The method comprises storing, with one of the plurality of NAT modules executing in a network device, data defining a local pool of two or more unallocated NAT resources for use in performing network address translation but that have not yet been allocated for use in performing network address translation, wherein each of the NAT resources of the local pool of NAT resources includes a network address and a network port number and receiving, with the one of the plurality of NAT modules, a packet that includes a source address. The method also comprises determining, with the one of the plurality of NAT modules, whether any of the NAT resources from the local pool of NAT resources are available for use in obscuring the source address and, in response to the determination that none of the NAT resources from the local pool of NAT resources are available for use in obscuring the source address, requesting, with the one of the plurality of NAT modules, one or more additional NAT resources for use in obscuring the source address. The method further comprises performing, with the one of the plurality of NAT modules, network address translation to obscure the source address of the packet using one of the one or more additional NAT resources to generate a modified packet, and forwarding, with the network device, the modified packet to a destination identified by a destination address specified within the modified packet.

In another embodiment, a network device comprises at least one interface card that receives a packet including a source address and a control unit that includes a plurality of NAT modules, wherein each of the plurality of NAT modules stores data defining a local pool of two or more unallocated NAT resources for use in performing network address translation but that have not yet been allocated for use in performing network address translation, wherein each of the NAT resources of the local pools of NAT resources includes a network address and a network port number. One of the plurality of NAT modules receives the packet, determines whether any of the NAT resources from the local pool of NAT resources are available for use in obscuring the source address of the packet, in response to the determination that none of the NAT resources from the local pool of NAT resources are available for use in obscuring the source address, requests one or more additional NAT resources for use in obscuring the source address, and performs network address translation to obscure the source address of the packet using one of the one or more additional NAT resources to generate a modified packet. The at least one interface card forwards the modified packet to a destination identified by a destination address specified within the modified packet.

In another embodiment, a non-transitory computer-readable storage medium comprising instructions that cause a processor of a network device to store data defining a local pool of two or more unallocated NAT resources for use in performing network address translation but that have not yet been allocated for use in performing network address translation, wherein each of the NAT resources of the local pool of NAT resources includes a network address and a network port number, receive a packet that includes a source address, determine whether any of the NAT resources from the local pool of NAT resources are available for use in obscuring the source address, in response to the determination that none of the NAT resources from the local pool of NAT resources are available for use in obscuring the source address, request one or more additional NAT resources for use in obscuring the source address, perform network address translation to obscure the source address of the packet using one of the one or more additional NAT resources to generate a modified packet, and forward the modified packet to a destination identified by a destination address specified within the modified packet.

In another embodiment, a network system comprises a public network and a private network that includes a plurality of end-user devices and a router positioned intermediate to the plurality of end-user devices and the public network, wherein the router receives all network traffic originated by the plurality of end-user devices that is destined for the public network. The router includes at least one interface card that receives a packet including a source address and a control unit. The control unit includes a plurality of NAT modules, wherein each of the plurality of NAT modules stores data defining a local pool of two or more unallocated NAT resources for use in performing network address translation but that have not yet been allocated for use in performing network address translation, wherein one of the plurality of NAT modules receives the packet, determines whether any of the NAT resources from the local pool of NAT resources are available for use in obscuring the source address of the packet, in response to the determination that none of the NAT resources from the local pool of NAT resources are available for use in obscuring the source address, requests one or more additional NAT resources for use in obscuring the source address, and performs network address translation to obscure the source address of the packet using one of the one or more additional NAT resources to generate a modified packet, and wherein the at least one interface card forwards the modified packet to a destination identified by a destination address specified within the modified packet.

In another embodiment, a method of allocation network resources for use in network address translation (NAT) is described. The method comprises storing, with the one of the plurality of NAT modules, data statically defining an initial local pool of two or more unallocated NAT resources for use in performing network address translation but that have not yet been allocated for use in performing network address translation and receiving, with the one of the plurality of NAT modules, a packet that includes a source address. The method also comprises determining, with the one of the plurality of NAT modules, whether any of the NAT resources from the initial local pool of NAT resources are available for use in obscuring the source address, in response to the determination that none of the NAT resources from the initial local pool of NAT resources are available for use in obscuring the source address, requesting, with the one of the plurality of NAT modules, that one of the remaining ones of the plurality of NAT modules allocate an additional NAT resource from a local pool of NAT resources stored by the one of the remaining ones of the plurality of NAT modules and updating the initial local pool of NAT resources with the one additional NAT resource allocated by the one of the remaining ones of NAT modules to increase a number of NAT resources available to be allocated for use in obscuring the source address within the local pool. The method further comprises performing, with the one of the plurality of NAT modules, network address translation to obscure the source address of the packet using the additional NAT resources added to the updated initial local pool of NAT resources to generate the modified packet and forwarding, with the network device, the modified packet to a destination identified by a destination address specified within the modified packet.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
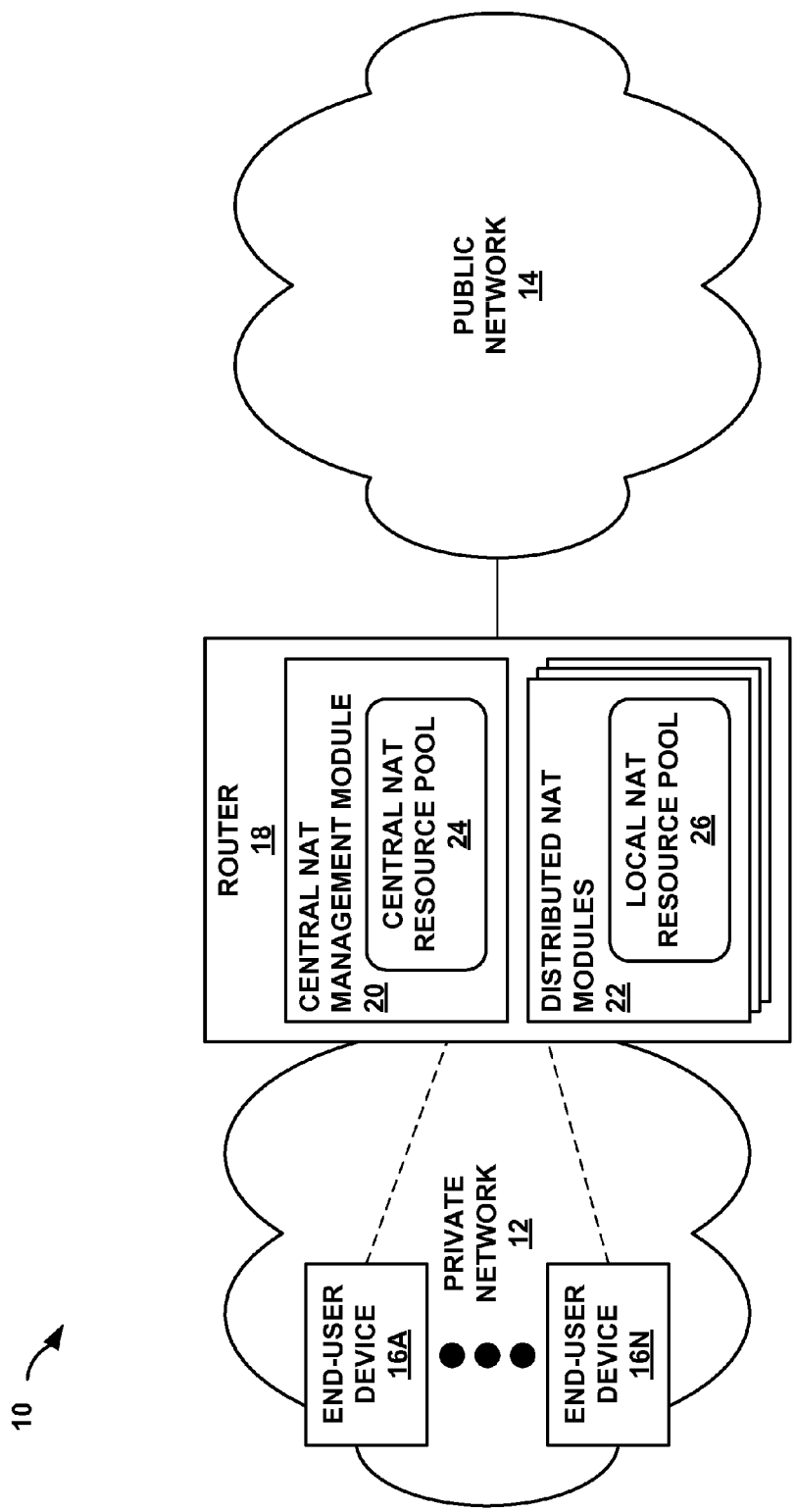
FIG. 1 is a block diagram illustrating an exemplary network system that implements the network address translation techniques described in this disclosure.

FIG. 1 is a block diagram illustrating an exemplary network system 10 that implements the network address translation techniques described in this disclosure. As shown in the example of FIG. 1, network system 10 includes a private network 12 and a public network 14. Private network 12 represents any network owned and operated by a private entity, such as a business or enterprise. Private network 12 includes a number of end-user devices 16A-16N ("end-user devices 16"), which represent common network-capable devices, such as laptop computers (including so-called "netbooks"), desktop computers, printers, servers, hubs, switches, routers, workstations, cellular phones (including so-called "smart phones"), personal or portable media players (PMPs), portable video devices, televisions (such as Internet-ready televisions) or any other device capable of accessing public network 14.

Generally, private network 12 implements a layer-2 (L2) protocol, such as the Ethernet protocol, to facilitate the delivery of L2 communications, which are often referred to as "L2 packets" within private network 12. In this context, private network 12 may represent a L2 network. In this disclosure, reference to layers followed by a number refers to layers of the Open Systems Interconnection (OSI) reference model. Layer-2 may also be referred to by its assigned name of data-link layer. End-user devices 16 generally implement this layer 2 protocol to generate and receive L2 packets from other end-user devices 16. While private network 12 generally operates in L2, private network 12 may also support some L3 functionality, including the assignment of at least one L3 network address to each of end-user devices 16 so as to enable end-user devices 16 to access L3 networks, such as public network 14.

Public network 14 represents a network that is generally available to the public, such as the Internet, meaning that this network is publically accessible by any device having a connection to public network 14. Public network 14 usually implements L3 protocols, such as an Internet protocol (IP), to facilitate the delivery of communications throughout public network 14. In this context, public network 14 may be referred to as a L3 network. Herein, the term "packet" refers to L3 packets sent in accordance with the IP protocol. Public network 14 may switch or otherwise route these L3 packets from a source address specified in each of these L3 packets to a destination address specified by each of these L3 packets. For this reason, public network 14 may be referred to as a packet-switched network. For purposes of comparison, a L2 network generally broadcasts each L2 packet to each end-user device located within the L2 network while a L3 network routes L3 packets based on their destination addresses.

In any event, the owner or operator of private network 12 may contract with an available Internet service provider to gain access to public network 14 usually for a monthly fee. The service provider may then allocate a pool of IP addresses for use by end-user device 16 in accessing public network 14. These IP addresses are generally unique within public network 14 or at least a portion of public network 14, thereby enabling public network 14 to route individual L3 packets destined for a particular one of end-user devices 16. Once these addresses are allocated to end-user devices 16, these allocated IP addresses may be broadcast throughout public network 14 so that devices that route these L3 packets (which are referred to as "routers") may learn of the location of end-user devices 16. These routers within public network 14 may exchange routing information identifying the location of these devices 16 within public network 14.

As further shown in the example of FIG. 1, private network 12 includes a router 18. Router 18 interfaces within public network 14 and is assumed, for purposes of illustration, to route all L3 network traffic originating from end-user devices 16 and destined to public network 14 and originating from public network 14 and destined to end-user devices 16. That is, for purposes of illustration, it is assumed that router 18 is the only interface from private network 12 to public network 14. The techniques should not be limited to these illustrative assumptions but may be implemented in other network contexts where multiple routers similar to router 18 each provide an interface to public network 14. Moreover, while described with respect to router 18 for ease of illustration purposes, router 18 is representative of one type of L3 network device that may implement the techniques set forth in this disclosure. Other types of L3 network devices may implement these techniques, including firewalls, intrusion detection prevention (IDP) devices, general security network devices or any other type of network device capable of implementing L3 protocols or any other protocol to which network address translation is commonly applied.

Once the IP addresses are allocated to end-user devices 16 using, for example, an address allocation protocol referred to as a dynamic host configuration protocol (DHCP), end-user devices 16 may access public network 14. To access public network 14, end-user devices 16 form L3 packets that include their respectively allocated IP address in a source address field of a header of the L3 packet and a destination address associated with a destination located in public network 14 in a destination address field in the header. End-user devices 16 then broadcast these L3 packets, which are received by router 18. Router 18 then routes these packets to public network 14, where routers and other L3 network devices of public network 14 (not shown in the example of FIG. 1) route these packets to the destinations associated with the destination address specified in each of the destination address fields in the headers of these L3 packets.

Generally, in addition to routing L3 packets to public network 14, router 18 first performs security measures, as malicious persons referred to as "hackers" may snoop or otherwise inspect the L3 network traffic leaving router 18 to discover information indicative of security vulnerabilities that these hackers may exploit to disrupt or otherwise harm the operation of private network 12. To illustrate, hackers may note the topology of private network 12 or the layout of end-user devices 16 and other back-end devices not shown in the example of FIG. 1, such as DHCP servers, using the headers of the L3 packets routed by router 18. In particular, hackers may inspect source address fields to determine IP addresses allocated to end-user devices 16 and the other various back-end devices. Using this IP source address information and through analysis of patterns of the L3 network traffic output by router 18, these hackers may determine an approximate topology of private network 12. With this topology in mind, these hackers may develop or deploy network attacks to exploit various vulnerabilities known to be present in the determined topology.

To prevent hackers from discovering these vulnerabilities, router 18 may be enabled to perform a security measure referred to as network address translation. Network address translation generally refers to the process of replacing source addresses specified in the header of L3 packets with an IP address allocated to router 18. While replacing the source address prevents the hackers from discovering precisely which one of end-user devices 16 originated the L3 packet and thereby prevents these hackers from discovering the topology of private network 12, it also prevents router 18 from being able to route return traffic from public network 14 to that one of end-user devices 16 considering that the originating device of a response in public network 14 merely sends its response back to the source address it received. If all of end-user devices 16 are obscured using the same IP address allocated to router 18, router 18 cannot then resolve to which of these devices 16 any given packet is destined.

To overcome this addressability issue, router 18 assigns a different source port to each of end-user devices 16. That is, the header of an IP packet defines both a source address and a source port, as well as, a destination address and a destination port, where each port is logical port represented by a TCP/IP port number. Many ports numbers are reserved for particular uses, such as port number 80 which is used for hypertext transfer protocol (HTTP), but a large number of the ports are unreserved and free for any given use. To resolve the individual one of end-user devices 18, router 18 maps each of the IP address allocated to end-user devices 16 to one of its available ports. Upon receiving return traffic from public network 14, router 18 performs a lookup on the destination port of the header of the IP return packet to determine an IP address allocated to the one of end-user devices 16 to which this IP return packet is destined. In this respect, router 18 obscures a L3 source address by replacing the L3 source address in an outgoing L3 packet with what is referred to as a "NAT resource." A NAT resource in this disclosure refers to the combination of an IP address and a port number.

Router 18 includes a central NAT management module 20 and a number of distributed NAT modules 22. Central NAT management module 20 represents a module responsible for storing data defining a central NAT resource pool 24 and assigning the NAT resources from this central NAT resource pool to distributed NAT modules 22 for their use in performing network address translation. Distributed NAT modules 22 represent modules that perform network address translation to obscure source addresses specified in headers of outbound network traffic received from end-user devices 16 and destined for public network 14. Distributed NAT modules 22 may also represent modules that perform network address translation to resolve source addresses from a destination address and destination port specified in headers of inbound network traffic received from public network 14 and destined for one or more of end-user devices 16.

The use of the term "module" in this disclosure is not intended to suggest a strictly software module. Instead, the term "module" is used throughout this disclosure generally to encompass hardware-only implementations, software-only implementations or implementations that consist of a combination of hardware and software. In this respect, modules 20 and 22 may both represent instructions stored to one or more computer-readable mediums, including so-called non-transitory computer readable media, that cause one or more processors to perform the operations described in this disclosure with respect to these modules 20 and 22. Alternatively, modules 20 and 22 may be implemented solely in hardware as, for example, application specific integrated circuits (ASICs), field programmable gate arrays (FPGAs), or the like. In some instances, portions of these modules may be implemented solely in hardware while other portions of these modules may be implemented in a combination of hardware and software. For example, central NAT resource pool 24 may be implemented as software program code executed by a central processing unit of router 18, where distributed NAT modules 22 may be implemented at least in-part as hardware within packet forward circuitry of the router.

In accordance with the techniques described in this disclosure, distributed NAT modules 22 may, upon initially being invoked or otherwise started, powered-on or enabled, request a pool of NAT resources from central NAT management module 20. Distributed NAT modules 22 may each issue a single request to central NAT management module 20, where each of these requests represent a request for two or more unallocated NAT resources, i.e., meaning NAT resources that have not been allocated to any network session. This pool of unallocated NAT resources is stored locally within distributed NAT modules 22 and is shown in the example of FIG. 1 as "local NAT resource pool 26." Local NAT resource pool 26 represents a pool of unallocated NAT resources stored locally within distributed NAT modules 22 that have not yet been allocated to any network session or utilized by their respective distributed NAT modules 22 to perform NAT. In this sense, local NAT resource pool 26 may be unallocated in that they are not yet assigned to any network session for use in performing NAT. By storing NAT resource pool 26 locally, distributed NAT modules 22 may more quickly perform network address translation as NAT modules 22 need not request a NAT resource in response to each and every packet that requires a new NAT resource.

Not every packet received by router 18 consumes a new NAT resource in most implementations of NAT. In these implementations of NAT, router 18 provides what is referred to as a first-path and a fast-path through router 18. The first-path generally refers to a series of operations router 18 performs to configure and perform NAT for a new communication session between an end-user device 16 and a resource within public network 14, while the fast-path refers to a subset of these first-path operations required to perform, but not configure, NAT for a previously established session. In this context, a session refers to a network session, which is usually identified by what is referred to as a "five-tuple." The five-tuple identifies the L3 source address, L3 source port, L3 destination address, L3 destination port, and a protocol, i.e., IP in this example. For each received L3 packet, router 18 extracts the five-tuple from the header of the received L3 packet and performs a lookup in a table to determine whether it has previously configured NAT for the session identified by the extracted five-tuple. If router 18 has not previously configured NAT for this session, router 18 assigns this session to one of distributed NAT modules 22, which performs the first-path operations. If router 18 has previously configured NAT for this session, router 18 determines the one of distributed NAT modules 22 responsible for this identified session and forwards the L3 packet to the identified one of distributed NAT modules 22, which proceeds to perform the fast-path operations.

Assuming this L3 packet is for a new session for which router 18 has not yet configure NAT, router 18 assigns this L3 packet and its corresponding session to one of distributed NAT modules 22. The distributed NAT modules 22 to which the session is assigned performs the first-path operations by reserving one of the NAT resources of its local NAT resource pool 26 for use in obscuring the source address and port specified in the L3 packet. If all of the local NAT resource of its local NAT resource pool 26 are reserved for use in obscuring source addresses for other sessions, the distributed NAT module 22 to which the session is assigned requests one or more additional NAT resources. In some implementations, distributed NATs module 22 may issue a single request for a batch of two or more additional NAT resources from central NAT management module 20, which may respond by allocating the requested batch of two or more additional NAT resources. In this way, when requesting these additional NAT resources from central NAT management module 20, distributed NAT modules 22 request a block or batch of additional NAT resources. While requesting a block or batch of two or more NAT resources improves NAT performance by reducing the number of message and delay caused by having to wait for a NAT resource to be allocated by central NAT management module 20, there is still some delay in requesting this resource, especially during peak traffic times when a number of distributed NAT modules 22 may concurrently request additional NAT resources.

In some instances, rather than issue the request for additional NAT resources to central NAT management module 20, the distributed NAT modules 22 to which the session is assigned may issue the request to one of the remaining distributed NAT modules 22. Distributed NAT modules 22 may each store data defining an order of remaining distributed NAT modules 22, where this order defines an order by which each of the distributed NAT modules request additional NAT resources from the other distributed NAT modules. As a result, the distributed NAT modules 22 to which the session is assigned may issue a request for additional NAT resources to remaining distributed NAT modules 22 requesting additional NAT modules in accordance with the defined order. Upon receiving a response from one of remaining distributed NAT modules 22 indicating that it cannot allocate one of its NAT resources for use by this one of the distributed NAT modules, the requesting distributed NAT module 22 may iterate to the next one of the remaining NAT modules 22 in the defined order and issue a request to that one of the remaining NAT modules 22. Usually these requests are for a lease or loan of additional NAT resources and may specify a duration during which the distributed NAT modules 22 requesting the NAT resources may utilize the leased additional NAT resource.

In an embodiment in which two or more of the distributed NAT modules 22 reside within the same hardware and, therefore, are local to one another, responses to requests may arrive in a shorter amount of time compared to the amount of time required to receive a response to a request issued to central NAT management module 20. Also, these peer-to-peer requests issued between distributed NAT modules 22 may improve utilization of local NAT resources, as some distributed NAT modules 22 may not consistently utilize all of their local NAT resources, such as in instances where one of distributed NAT modules 22 is assigned to service an enterprise that is not active in accessing public network 14, and thereby underutilize the NAT resources allocated to these distributed NAT modules 22. By facilitating the lease of NAT resources between distributed NAT modules 22, the techniques may improve the overall utilization of local NAT resources allocated to distributed NAT modules 22 as local NAT resources pools 26.

In this way, a distributed NAT module 22 determines whether any of the NAT resources from the local pool of NAT resources, i.e., local NAT resource pool 26 in this example, are available for use in obscuring a source address allocated to one of end-user devices 16. Moreover, in response to the determination that none of the NAT resources from local NAT resources pool 26 are available for use in obscuring the source address, the distributed NAT module 22 to which the session is assigned then requests one or more additional NAT resources for use in obscuring the source address from either central NAT management module 20 or one of the remaining ones of distributed NAT modules 22. In some instances, this one of distributed NAT management modules 22 is programmed to intentionally initiate a race condition by generating and outputting a request to both central NAT management module 20 and one or more of the remaining one of distributed NAT modules 22. In this race condition, the distributed NAT module 22 requesting the resources may receive more than one additional NAT resource in that both central NAT management module 20 and one of the remaining ones of distributed NAT modules 22 may respond with additional NAT resources.

After receiving one or more additional NAT resources, the requesting distributed NAT module 22 updates its local NAT resource pool 26 to record the additional NAT resources. Next, this one of distributed NAT modules 22 performs network address translation to obscure the source address of the packet using one of the one or more additional NAT resources to generate a modified packet. As noted above, performing network address translation involves replacing the source port with a port associated with the source address allocated to the one of end-user devices 16 that originated the packet. After performing network address translation using this additional NAT resource, router 18 forwards the modified packet to a destination within public network 14 identified by the destination address specified within the modified packet.

Assuming this session involves communications from public network 14 to the one of end-user devices 16 that originated the initial packet, router 18 determines that these return L3 packets is associated with the above noted session and that NAT has been previously configured for this session. Router 18 then forwards this return L3 packet to the one of distributed NAT modules responsible for handling network address translation for this session. This one of distributed NAT modules 22 then parses the return L3 packet to extract a destination address and destination port. Using this destination address and port as a lookup value, the one of distributed NAT modules 22 determines a L3 network address and port associated with the extracted destination address and port and replaces the destination address in the return L3 packet with the determined L3 network address and the destination port in the return L3 packet with the determined port. The determined network address and port correspond to the one of end-user devices 16 that originated the original packet. Router 18 then forwards this modified return packet to the one of end-user devices 16 that originated the original packet. In this manner, router 18 may perform of form of enhanced network address translation that may potentially improve the speed with which network address translation may be performed by allocating local NAT resource pools comprised of unallocated NAT resources as noted above to distributed NAT modules and enabling distributed NAAT modules to perform peer-to-peer NAT resource leasing.

Figure 2:
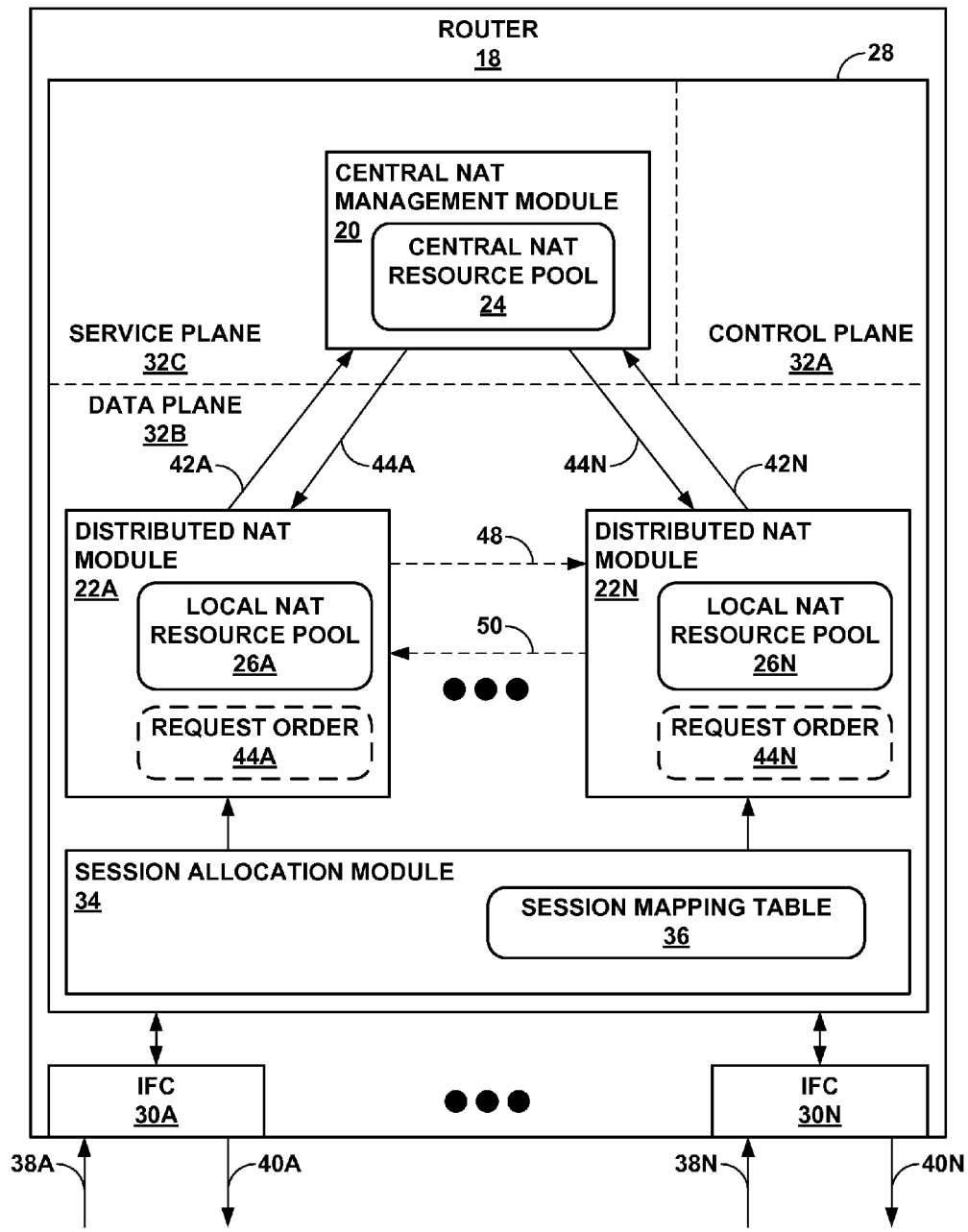
FIG. 2 is a block diagram illustrating router 18 of FIG. 1 in more detail.

FIG. 2 is a block diagram illustrating router 18 of FIG. 1 in more detail. Router 18 may route particular types of data units referred to as packets and as a result may be referred to as a "packet-based router." Moreover, router 18 may implement layer 3 (L3) protocols or network layer protocols (where L3 refers to the L3 of the OSI model, as described above), such as an Internet Protocol (IP), and route packets according to layer 3 information. Consequently, router 18 may also be referred to as a "layer 3 router", a "network layer router" or an "IP router." Again, router 18 may represent an example of a network device capable of performing network address translation in accordance with the techniques described in this disclosure. Although described with respect to this example router 18, the techniques may be implemented by any device capable of performing network address translation.

In the example of FIG. 2, router 18 includes a control unit 28. Control unit 28 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 28 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 28 may be divided into three logical or physical "planes" to include a first control or routing plane 32A, a second data or forwarding plane 32B and a third service plane 32C. That is, control unit 28 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations. Often, control plane 32A may logically implement service plane 32C in that service plane 32C is provided as a virtual service plane executing within control plane 32A. In this virtualized service plane implementation, control plane 32A may be considered to perform the functions attributed to service plane 32C below and in some instances this disclosure may ignore this virtualization and refer to central NAT management module 20 executing within control plane 32A. In this respect, central NAT management module 20 may execute within either service plane 32C when a dedicated service plane 32C is implemented or within control plane 32A when service plane 32C executes as a virtualized service plane 32C in a virtual environment provided by control plane 32A.

Control plane 32A of control unit 28 may provide the routing functionality of router 18. In this respect, control plane 32A may represent hardware or a combination of hardware and software of control unit 28 that implements routing protocols (not shown in the example FIG. 2) by which routing information (not shown in the example of FIG. 2) may be determined. The routing information may include information defining a topology of a network, such as network 14. Control plane 32A may resolve the topology defined by the routing information to select or determine one or more routes through network 14. Control plane 32A may then update data plane 32B with these routes, where data plane 32B maintains these routes as forwarding information (not shown in the example of FIG. 2). Forwarding or data plane 32B may represent hardware or a combination of hardware and software of control unit 28 that forwards network traffic in accordance with the forwarding information. Service plane 32C may represent hardware or a combination of hardware and software of control unit 28 responsible for providing and managing one or more services, such as a NAT service.

Service plane 32C of control unit 28 provides an operating environment for service-related modules, including central NAT management module 20, which stores data defining central NAT resource pool 24. Data plane 32B provides high-speed packet processing and forwarding circuitry and includes distributed NAT modules 22A-22N (each of which represents a different one of distributed NAT modules 20 described above with respect to the example of FIG. 1). Distributed NAT modules 20 each store data defining a respective one of local NAT resource pools 26A-26N (each of which represents a different one of local NAT resource pools 26 described above with respect to the example of FIG. 1). Data plane 32B also include a session allocation module 34 that stores data defining a session mapping table 36 and maintains or otherwise edits, updates, deletes and creates entries within session mapping table 36 associating different ones of distributed NAT modules 22 with sessions for which NAT has been configured. In this sense, session allocation module 34 represents a module that maintains associations between distributed NAT modules 22 and sessions for which NAT has been previously configured. Session allocation module 34 also, in some instances, allocates sessions for which NAT has not yet been configured to one of distributed NAT modules 22, where these sessions may be referred to as "new session" in this disclosure considering that these sessions represent new sessions from the perspective of distributed NAT modules 22.

As further shown in FIG. 2, router 18 includes interface cards (IFCs) 30A-30N ("IFCs 30") that receive and send packet flows or network traffic via inbound network links 38A-38N ("inbound network links 38") and outbound network links 40A-40N ("outbound network links 40"), respectively. Router 18 typically include a chassis (not shown in the example of FIG. 2) having a number of slots for receiving a set of cards, including IFCs 30. Each card may be inserted into a corresponding slot of a chassis for communicably coupling the card to a control unit 28 via a bus, backplane, or other electrical communication mechanism. IFCs 30 are typically coupled to network links 38, 40 via a number of interface ports (not shown), and forward and receive packets and control information from control unit 28 via respective paths (which, for ease of illustration purposes, are not explicitly denoted in FIG. 2).

Initially, upon powering up or otherwise enabling router 18, control unit 28 loads, configures and executes central NAT management module 20, as well as, distributed NAT modules 22. Upon executing distributed NAT modules 22, each of distributed NAT modules 22 issue a request, such as respective requests 42A-42N ("requests 42"), to central NAT management module 20 requesting that a batch of two or more NAT resources form central NAT resource pool 24 be allocated to the respective requesting ones of distributed NAT modules 22. In response to requests 42, central NAT management module 20 responds to each of requests 42 with a response, such as respective responses 44A-44N ("responses 44"), allocating the batch of two or more NAT resources from central NAT resource pool to the respective requesting ones of distributed NAT modules 22. Central NAT management module 20 may also update entries of central NAT resource pool corresponding to the allocated NAT resources to associate the allocated NAT resource with the one of distributed NAT modules 22 to which the corresponding NAT resource was allocated. Requests 42 and responses 44 generally represent messages or communications that conform to a proprietary or non-proprietary protocol for communicating between control plane 32A, data plane 32B and service plane 32C.

Upon receiving responses 44, those of distributed NAT modules 22 that receive one of responses 44 form their respective local NAT resource pool 26 from the allocated NAT resources identified in the respective ones of responses 44. That is, distributed NAT modules 22 store data defining local NAT resource pools 26, where such pool 26 may be defined using a data structure, such as a table that includes entries for each of the allocated NAT resources. After forming or otherwise defining local NAT resource pools 26, distributed NAT modules 22 may begin performing NAT on outbound network traffic originating from end-user devices 16 and destined for public network 14 and on inbound network traffic originating from public network 14 and destined for end-user devices 16.

Once router 18 is enabled, initialized and ready to process network traffic, IFCs 30 begin to receive outbound network traffic via inbound network links 38A that originated from end-user devices 16 and destined for public network 14. IFCs 30 forward this traffic to control unit 28, where session allocation module 34 parses the above noted five-tuple from each of the packets forming the outbound network traffic. Session allocation module 34 uses this five-tuple as a session identifier and accesses session mapping table 36 to determine whether this session identifier has been previously associated with one of distributed NAT modules 22. In this way, session allocation module 34 determines whether NAT has been previously configured for this session or, in other words, whether one of distributed NAT modules 22 has previously been assigned to handle this session. Assuming this session has not been previously assigned to one of distributed NAT modules 22, session allocation module 34 allocates this session to one of distributed NAT modules 22, where this allocation may take into consideration load balancing and other concerns. In some instances, certain ranges of source IP addresses are assigned to certain ones of distributed NAT modules 22 and session allocation module 34 may allocate new sessions in accordance with this static assignment. Regardless of how this allocation is performed, session allocation module 34 is assumed to assign this new session to distributed NAT module 22A for purposes of illustration and updates the entry corresponding to this session in session mapping table 36 to reflect that this new session was allocated to distributed NAT module 22A. In this sense, distributed NAT module 22A becomes the handling one of distributed NAT modules 22 for this session. Session allocation module 34 then forwards the packet to distributed NAT module 22A.

Distributed NAT module 22A receives the packet and again parses the above-noted five-tuple from this packet and performs a lookup in local NAT resource pool 26A using this five-tuple as a session identifier to determine whether NAT has been previously configured for this session. Assuming this is a new session, distributed NAT module 22A determines that NAT has not been previously configured for this session and thereby initiates first path operations to configure and perform NAT for this session. To configure NAT, distributed NAT module 22A attempts to allocate a NAT resource from its local NAT resource pool 26A to the session for use in obscuring the source network address and source port in the packet. Obscuring the source network address and source port refers to replacing the current source network address and source port specified in the header of the packet with the allocated NAT resource. To allocate one of these NAT resources, distributed NAT module 22A first determines whether there are any NAT resources available for allocation in local NAT resource pool 26A.

If there is an available NAT resource, distributed NAT module 22A updates an entry in local NAT resource pool corresponding to this available NAT resource to associate this available NAT resource with the parsed five-tuple, which again may represent a session identifier. Distributed NAT module 22A then performs network address translation to replace the source address and source port specified in the header of the packet with the allocated NAT resource, i.e., an IP address assigned to router 18 and one of the 65536 ports in this example. As noted above, the combination of the source address and port uniquely identifies the session initiated by this one of end-user devices 16 that originated the packet so that upon receiving return traffic destned for this end-user devices 16 specifying this NAT resource, distributed NAT module 22A may resolve this NAT resource uniquely to this session initiated by the one of end-user devices 16, e.g., end-user device 16A. After performing network address translation to generate a modified packet, router 18 forwards this modified packet to its intended destination via one of IFCs 30 and its corresponding outbound link 40.

If there is not a NAT resource available for allocation in local NAT address pool 26A, distributed NAT module 22A then requests one or more additional NAT resources. Distributed NAT module 22A may be configured any number of ways to request these additional NAT resources. In one exemplary instance, distributed NAT module 22A is configured to only request a batch of two or more additional NAT resources from central NAT management module 20. In this central mode, each of distributed NAT modules 22 may be configured to monitor their respective local NAT resources pools 26 and, upon detecting that the usage of NAT resources within their respect local NAT resource pools 26 exceeds a certain limit or threshold (e.g., 80% or 90% usage), these distributed NAT reousrces 22 may proactively issue a request for additional NAT resources to central NAT management module 20. This form of proactive NAT resource reservation may improve performance as NAT modules 22 may not run out of resources when processing a current packet and have to request additional NAT resources, causing what may be considered unnecessary delay.

In another exemplary instance, distributed NAT module 22A is configured to first request one or more additional NAT resources from peer distributed NAT modules 22B-22N ("peer NAT modules 22") before requesting a batch of two or more additional NAT resources from central NAT management module 20, which may be referred to as a mixed mode considering that it performs both the peer-to-peer and the central NAT resource allocation modes. In other instances, distributed NAT modules 22 are configured to perform only the peer-to-peer mode without performing the central mode. In this second exemplary instance, each of distributed NAT modules 22 may store data defining a request order 46A-46N ("request orders 46," which are shown in dashed-lined format to illustrate that not all implementations of the techniques described in this disclosure necessarily rely on request orders 46). Distributed NAT module 22A generates and issues a peer request 48 in accordance with request order 46A that requests at least one additional NAT resource from one of peer distributed NAT modules 22 (which also may be referred to as "remaining distributed NAT modules 22"), which defines an order by which requests should be sent to peer distributed NAT modules 22.

If the first one of peer distributed NAT modules 22 issues a peer response 50 indicating that it does not have any available NAT resources to lease to distributed NAT module 22A, distributed NAT module 22A generates and issues a peer request 48 to the next one of peer distributed NAT modules 22 listed in request order 46A. This process continues until either an additional NAT resource is leased from one of peer distributed NAT modules 22 or distributed NAT module 22A has issued a peer request to each of peer distributed NAT modules 22 listed in request order 46A. If all of peer distributed NAT modules 22 listed in request order 46A respond with a peer response 50 indicating that they do not have any NAT resources available for lease, distributed NAT module 22A may issue a central request 42A to central NAT management module 20 requesting a batch of two or more additional NAT resources similar to that described above.

In yet a third exemplary instance, distributed NAT module 22A may perform the peer request aspect of the second instance, but maintain a counter, timer or other variable to limit the amount of time that distributed NAT module 22A spends attempting to secure a lease for a peer NAT resource. Once this timer expires or the limit is reached, distributed NAT resource 22A may initiate a race condition by sending a central request 42A to central NAT management module 20 in conjunction with continuing to secure a lease for a peer NAT resource from one of peer distributed NAT modules 22. Alternatively, distributed NAT module 22A may be configured to only issue a certain limited number of requests for additional NAT resources and, if all of these requests are denied, distributed NAT module 22A may drop the packet. This limit may optimize NAT performance as issuing each request takes a certain amount of time. This limit may enable a certain amount of determinacy of performance which may improve packet scheduling for delivery in data plane 32B.

In yet another example, distributed NAT modules 22 may each be statically configured with local NAT resource pool 26A and control unit 28 may not implement central NAT management module 20. In this solely peer-to-peer mode, distributed NAT module 22A may only issue peer requests to peer distributed NAT modules 22B-22N in the manner described above with respect to the so-called mixed mode described above where both the central or master-slave and peer-to-peer mode is implemented to request additional NAT resources. While a number of such instances are described above, the techniques should not be limited to these exemplary additional NAT resource request instances. The techniques may be implemented to utilize any combination of central and peer request processes to secure additional NAT resources including utilizing only one such processor, such as implementing only the central request process.

Regardless of how the additional NAT resource is secured, i.e., either by central request 42A for a batch of two or more additional NAT resources or by peer request 48 to secure a lease for at least one additional NAT resource form one of peer distributed NAT modules 22, distributed NAT module 22A typically secures one or more additional NAT resources and updates local NAT resource pool 26A, e.g., creates an entry in local NAT resource pool 26A corresponding to each of the one or more additional NAT resources. Distributed NAT module 22A then allocates one of these additional NAT resources to the session, updates local NAT resource pool 26A to reflect the allocation of this additional NAT resource to this session and performs network address translation using the allocated NAT resources to obscure the source address and port specified in the header of the packet in the manner described above to generate a modified packet. Router 18 then forwards this modified packet via one of IFCs 30 and outbound links 40 to its intended destination identified by the destination address in the header of the packet.

When processing subsequently received network traffic, session allocation module 34 may determine that a packet received after sending the modified packet also corresponds to the same session as the modified packet by performing a lookup of the five-tuple parsed from this subsequent packet in session mapping table 36. This lookup return an entry of session mapping table 36 associating distributed NAT module 22A with this session and therefore this subsequent packet. Session allocation module 34 then forwards this subsequent packet to distributed NAT module 22A. Distributed NAT module 22A receives this subsequent packet, parses the five-tuple (which again may represent a session identifier) from the subsequent packet and performs a lookup using this five-tuple as an index into local NAT resource pool 26A. The result of this lookup returns the previously configured entry associating this session with the above noted NAT resource. From this entry, distributed NAT module 22A determines that NAT has been previously configured for this session. As a result of this determination, distributed NAT module 22A performs fast path operations, which avoids performing those operations required to configure NAT for this session. Instead, NAT module 22A directly performs NAT using the previously allocated NAT resource identified in the retrieved entry to obscure the source address and port in the header of the subsequent packet to generate a modified subsequent packet. After performing NAT, router 18 forwards this packet to its intended destination within public network 14 identified by the destination address in the header of the modified subsequent packet.

Session allocation module 34 may also receive an inbound packet from public network 14 destined for end-user device 16A that correspond to the same session as both the modified packet and subsequently modified packet. Session allocation module 34 may perform the above noted operations to determine which of distributed NAT modules 22 is handling this session and forward this inbound packet to distributed NAT module 22A based on the determination. Distributed NAT module 22A also performs the above noted operations to determine that NAT has been previously configured for this session and performs NAT to replace the NAT resource with the corresponding source address and port specified in the entry retrieved using the NAT resource as an index into local NAT resource pool 26A. This process of replacing NAT resources with actual source addresses and ports falls may be characterized as performing NAT generally and specifically as performing an aspect of NAT referred to in this disclosure as inverse NAT. In any event, after performing inverse NAT, router 18 forwards this packet to end-user device 16A via an appropriate one of IFCs 30 and a corresponding one of outbound links 40.

Figure 3A:
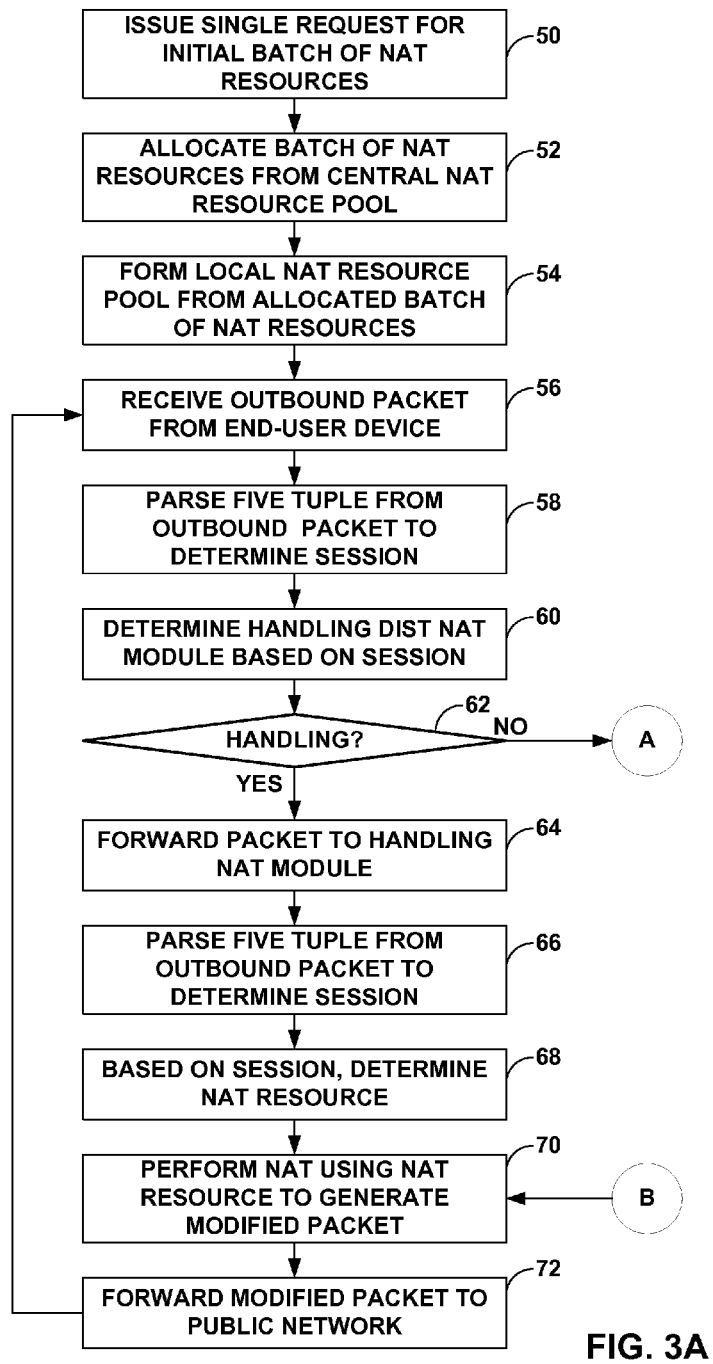
FIGS. 3A and 3B are flowcharts illustrating example operation of a network device in implementing the enhanced network address translation techniques described in this disclosure.
Figure 3B:
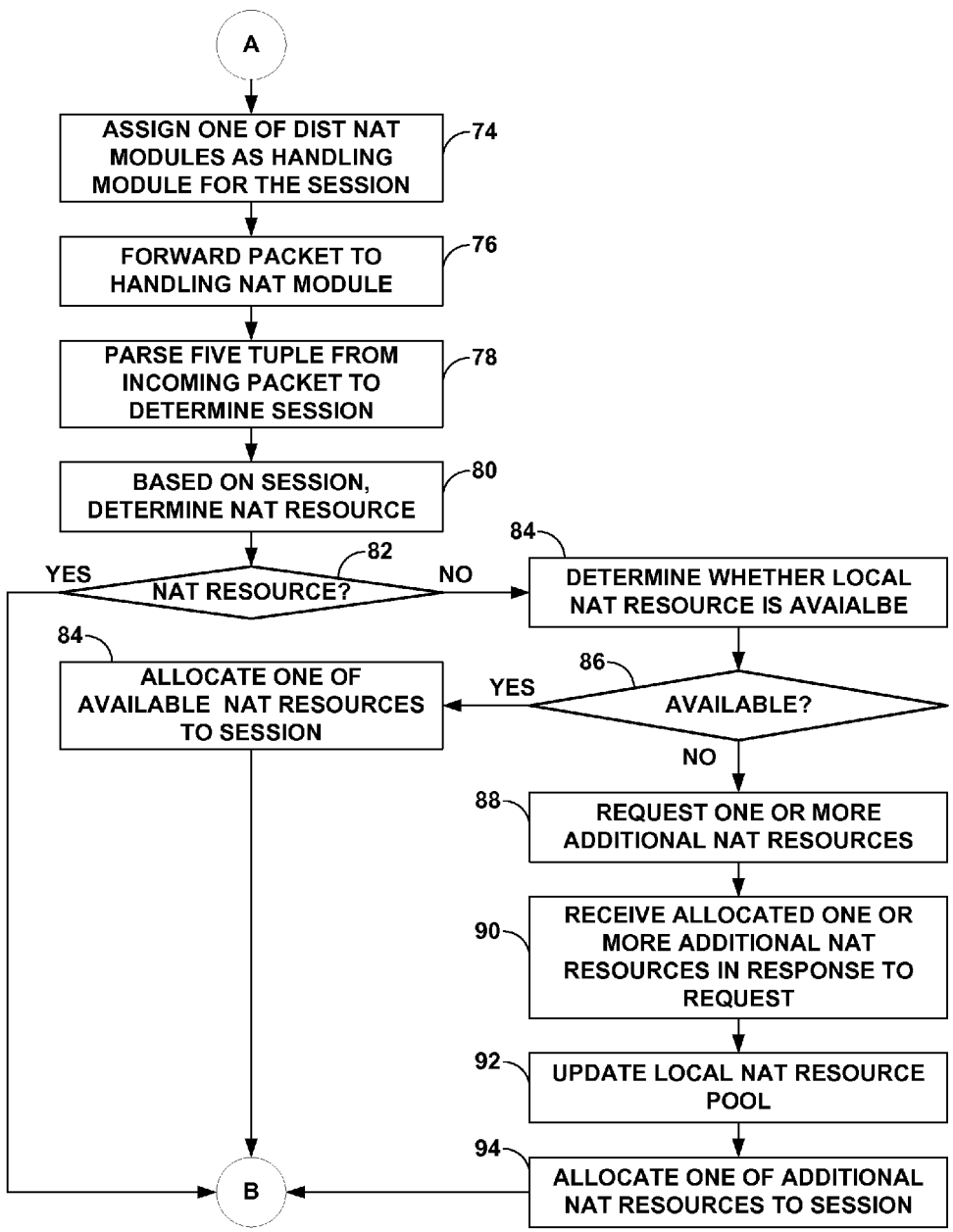

FIGS. 3A and 3B are flowcharts illustrating example operation of a network device, such as router 18 of the example of FIG. 2, in implementing the enhanced network address translation techniques described in this disclosure. While described with respect to a particular type of network device, i.e., router 18, in this example, the techniques may be implemented by any type of network device capable of performing network address translation.

Referring first to FIG. 3A, upon activating, powering on, or otherwise enabling router 18, distributed NAT modules 22 each issues a single request for an initial batch of two or more NAT resources from central NAT management module 20 (51). In some instances, distributed NAT modules 22 each generate a respective one of requests 42 and output their respective ones of requests 42 to central NAT management module 20, where these requests 42 request the initial batch of two or more NAT resources. Central NAT management module 20, upon receiving these requests 42, allocates a batch of two or more NAT resources from central NAT resource pool 24 in response to each of these requests 42 (52). Central NAT management module 20 typically updates entries in central NAT resource pool 24 to indicate that the allocated NAT resources are associated with a corresponding one of distributed NAT modules 22 as described above. Central NAT management module 20 generally allocates the batches of NAT resources by generating a respective one of responses 44 that specifies the batch of NAT resources and outputting these responses 44 to each of distributed NAT modules 22. In response to receiving these responses 44 specifying the allocated NAT resources, distributed NAT management modules 22 form respective ones of local NAT resource pools 26 from the allocated batch of NAT resources (54). As noted above, the NAT resources of local NAT resource pools 26 are unallocated in the sense that distributed NAT modules 22 have not as of yet allocated these NAT resources to any network session for use in obscuring a source address. After forming these local NAT resource pools 26 of unallocated NAT resources, distributed NAT modules 26 may begin processing packets by performing network address translation, which involves allocating the NAT resources to the network sessions to which these packets correspond.

Router 18 then receives at least one outbound packet from one of end-user devices 16, e.g., end-user device 16A (56). Session allocation module 34 parses a five-tuple from the received outbound packet to determine a session to which the packet is associated (58). Session allocation module 34 then determines a handling one of distributed NAT modules 22 based on the determined session in the manner described above (60). In some instances, session allocation module 34 stores data defining a table, which is represented in the example of FIG. 2 as session mapping table 36. This table, as described above, stores entries associating sessions with distributed NAT modules 22. Session allocation module 34 may use the parsed five-tuple as an index into table 36 to determine a handling one of distributed NAT modules 22 (60). If there is an entry in the table associated with the parsed five-tuple, meaning that there is a handling one of distributed NAT modules 22 ("YES" 62), session allocation module 34 forwards the outbound packet to the identified handling one of distributed NAT modules 22, e.g., distributed NAT module 22A (64).

In response to receiving this outbound packet, distributed NAT module 22A parses the five-tuple from the outbound packet to determine the session (66). Based on this determined session, distributed NAT module 22A determines a NAT resource for use in obscuring the source address and source port located in the header of the outbound packet in the manner described above (68). Distributed NAT module 22A then performs network address translation (NAT) using the determined NAT resource to generate a modified packet, again as described above (70). Router 18 then forwards the modified packet to public network 14 (72). Router 18 may continue to process received outbound packets in this manner (56-72).

However, if session allocation module 34 determines that there is not a handling one of distributed NAT modules 22 for the determined session ("NO" 62), session allocation module 34, referring now to the example of FIG. 3B, assigns one of distributed NAT modules 22, e.g., distributed NAT module 22A, as the handling one of distributed NAT modules 22 for the determined session (74). Session allocation module 34 updates its session mapping table 36 to indicate that distributed NAT module 22A is the handling one of distributed NAT modules 22 for the determined session. Session allocation module 34 then forwards the packet to the handling one of distributed NAT modules 22 for this session, i.e., distributed NAT module 22A in this example (76). Distributed NAT module 22A receives this packet.

In response to receiving this packet, distributed NAT module 22A parses the five-tuple from the header of the packet to determine a session to which this packet corresponds (78). Based on this session, distributed NAT module 22A determines whether a NAT resource has been previously allocated for use in obscuring the source address and source port specified in the header of this packet (80). If a NAT resource has been previously allocation ("YES" 82), distributed NAT module 22A performs NAT using the determined NAT resource to generate a modified packet and router 18 forwards this modified packet to public network 14 in the manner described above (referring back to the example of FIG. 3A; 70, 72).

If a NAT resource has not been previously allocation ("NO" 82), distributed NAT module 22A determines whether a local NAT resource is available in local NAT resource pool 26A for use performing NAT, which involves obscuring the source address and source port specified in the header of the packet (84). If a local NAT resource is available ("YES" 86), distributed NAT module 22A allocates one of the available NAT resources in local NAT resource pool 26 to the session (84), performs network address translation using the allocated NAT resource to generate a modified packet (referring back to the example of FIG. 3A; 70) and router 18 forwards the modified packet to public network 14 (72).

Returning to FIG. 3B, if none of the local NAT resources are available for use in performing NAT within local NAT address pool 26 ("NO" 86), distributed NAT module 22A requests one or more additional NAT resources in any of the manners listed above (88). In some instances, distributed NAT module 22A may generate and output a central request 42A requesting a batch of two or more additional NAT resources from central NAT management module 20 as described above. In other instances, distributed NAT module 22A may generate a peer request 48 to one of peer distributed NAT modules 22. Regardless of the type of request, distributed NAT module 22A receives a response, i.e., either a central response 44A or a peer response 50 in this example, allocating distributed NAT module 22A one or more additional NAT resources in response to the request (90). Distributed NAT module 22A updates local NAT resource pool 26A to include these one or more allocated NAT resources and allocates one of the additional NAT resources to the session, as described above (92, 94). Distributed NAT module 22, referring again to the example of FIG. 3A, performs network address translation using the allocated NAT resource to generate a modified packet and router 18 forwards the modified packet to public network 14 (70, 72).

While described above with respect to outbound packets, router 18 may also perform network address translation on inbound packets originated from public network 14 and destined for end-user devices 16. Considering that these inbound packets are mostly in response to the outbound packets, router 18 has already configured NAT for these sessions. If the packet originates in public network 14 but is not in response to an outbound packet originated by end-user devices 16, router 18 may perform as described above to network address translate the packet before sending it to its intended destination, i.e., one of end-user devices 16. In some instances, for these packets that originate in public network 14 but are not in response to an outbound packet originated by end-user devices 16, router 18 may drop or simply block these packets from entering private network 12.

Figure 4A:
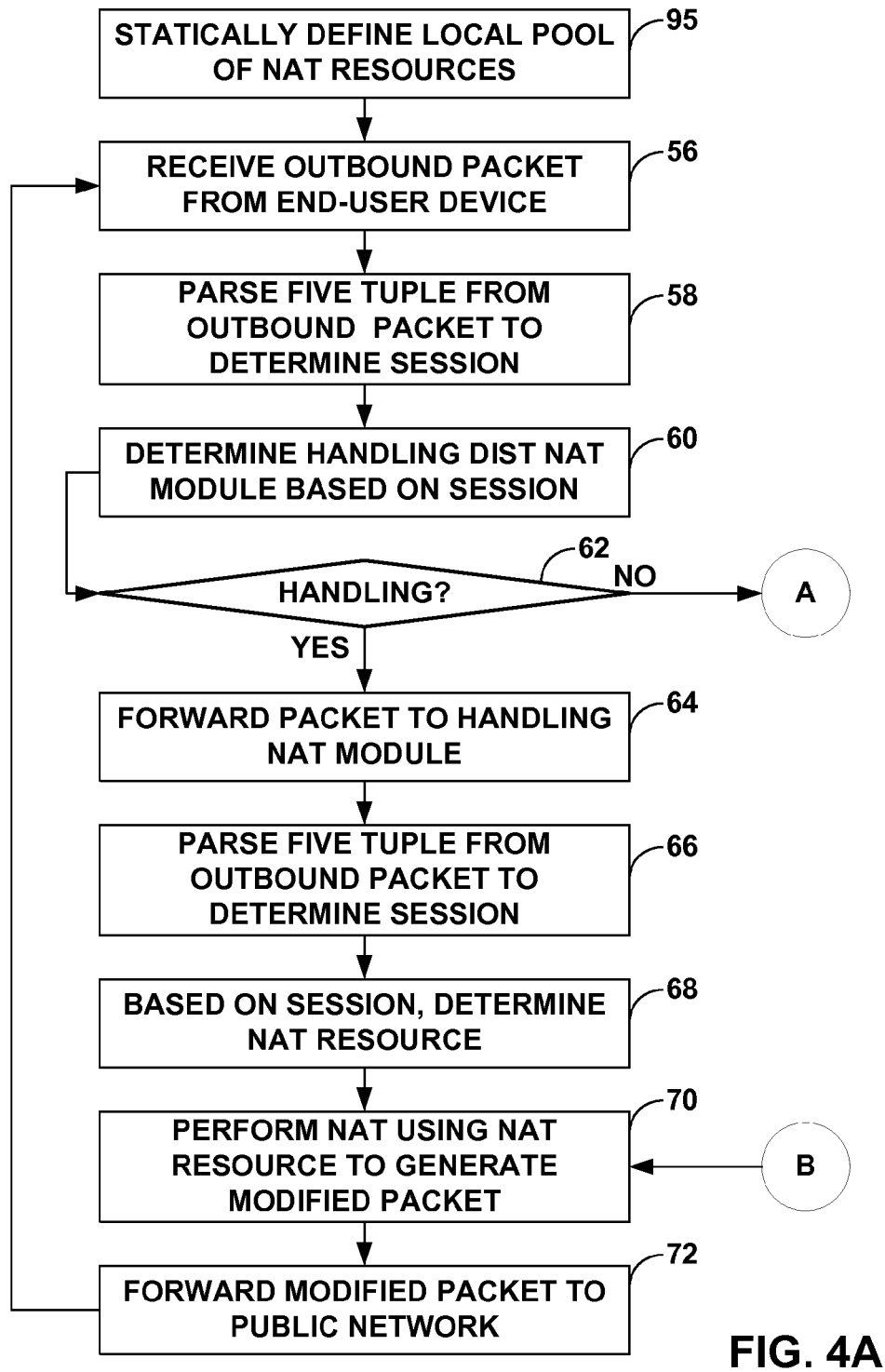
FIGS. 4A and 4B are flowcharts illustrating alternative example operation of a network device in implementing the enhanced network address translation techniques described in this disclosure.
Figure 4B:
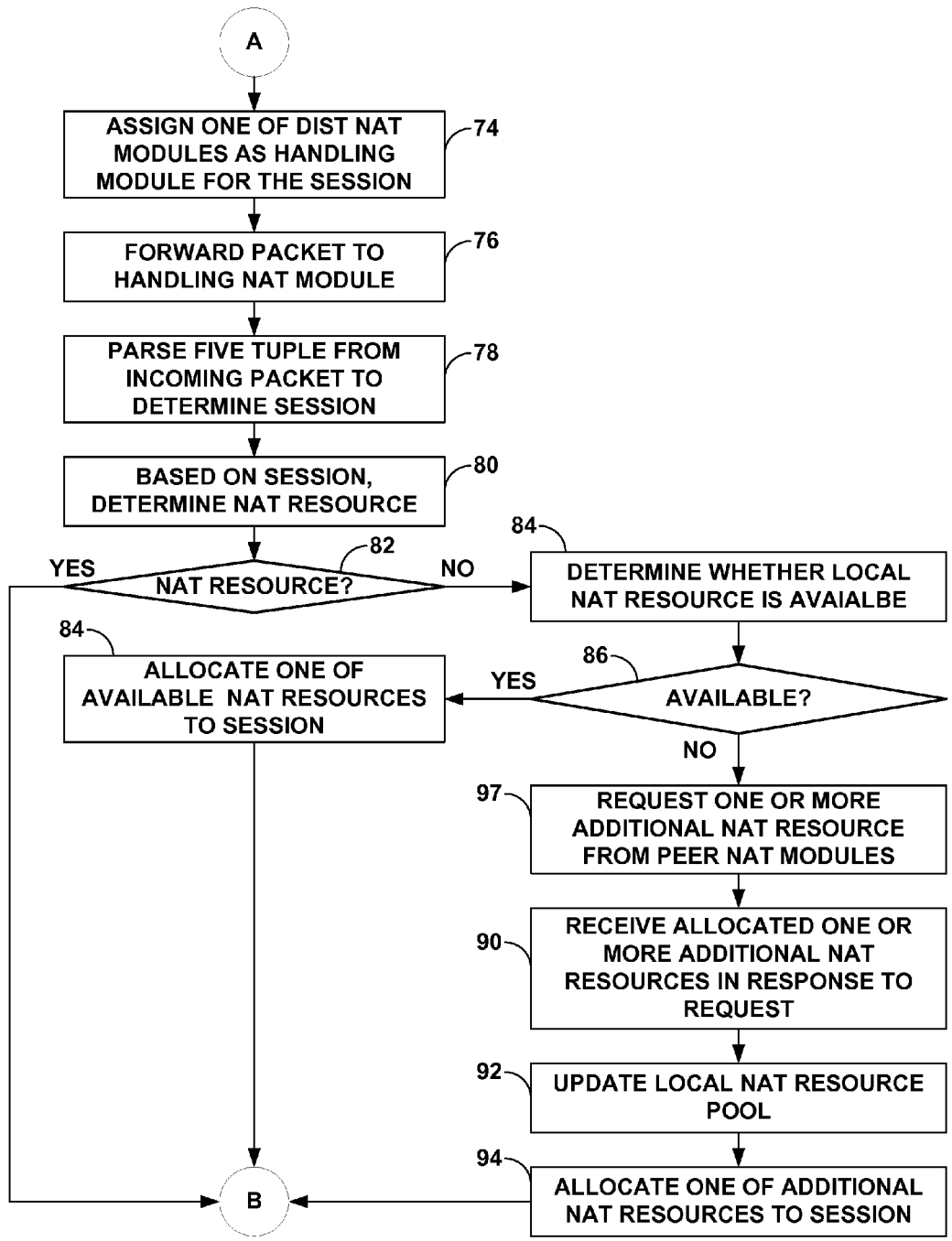

FIGS. 4A and 4B are flowcharts illustrating alternative example operation of a network device, such as router 18 of the example of FIG. 2, in implementing the enhanced network address translation techniques described in this disclosure. While described with respect to a particular type of network device, i.e., router 18, in this example, the techniques may be implemented by any type of network device capable of performing network address translation.

For the most part, the techniques set forth in the example of FIGS. 4A and 4B are substantially similar to those set forth in FIGS. 3A and 3B, except for the initial step of allocating the local pools of NAT resources and how requests are issued. In the example of FIG. 4A, rather than request a block or batch of addresses from central NAT management module 20, distributed NAT modules 22 statically, at least initially, define local pool of NAT resources 26. In some instances, an administrator or other user interfaces with a user interface module of control unit 28 (not shown for ease of illustration purposes) to provision local NAT resource pools 26. When statically provisioned in this manner, distributed NAT modules 22 implement the peer-to-peer mode of NAT resource reallocation. Consequently, rather than issue a general request either to central NAT management module 20, distributed NAT modules 22 request one or more additional NAT resources from peer NAT modules 22 (97, referring to FIG. 4B). In this peer-to-peer mode or implementation, central NAT management module 20 need not be implemented. In most, if not all, other respects, the techqniues proceed as set forth above with respect to FIGS. 3A and 3B (which is illustrated in the examples of FIGS. 4A and 4B using the same identifying numerals as those used in FIGS. 3A and 3B, i.e., 56-94 in this example).

Figure 5:
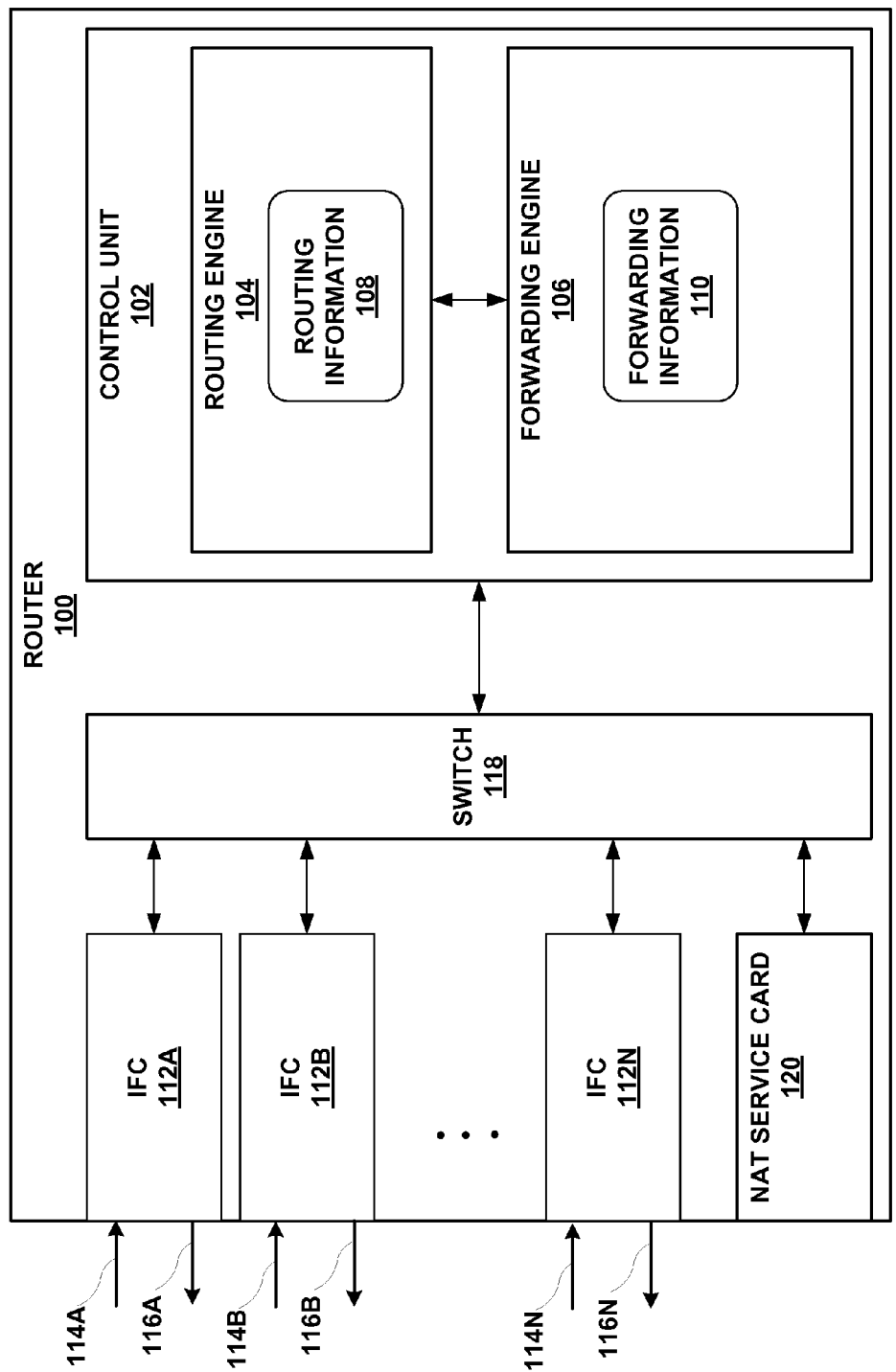
FIG. 5 is a block diagram illustrating another router that performs network address translation in accordance with the techniques of this disclosure.

FIG. 5 is a block diagram illustrating another exemplary router 100 that performs network address translation in accordance with the techniques of this disclosure. Although described with respect to router 100, any network device capable of performing NAT may implement the techniques described herein and the techniques should not be limited to the example set forth in FIG. 5.

As shown in FIG. 5, router 100 includes a control unit 102 that comprises a routing engine 104 and a forwarding engine 106. Routing engine 104 is primarily responsible for maintaining routing information 108 to reflect the current topology of a network and other network entities to which it is connected. In particular, routing engine 104 maintains routing information 108 to accurately reflect the topology of the network and other entities. In accordance with routing information 108, forwarding engine 106 maintains forwarding information 110 that associates network destinations with specific next hops and corresponding interfaces ports.

Router 100 includes a set of interface cards (IFCs) 112A-112N ("IFCs 112") for communicating packets via inbound links 114A-114N ("inbound links 114") and outbound links 116A-116N ("outbound links 116"). Each of IFCs 112 couple to and communicate with control unit 102 via switch 118. Switch 118 may comprise any communication medium capable of communicatively coupling one or more endpoints, e.g., IFCs 112, control unit 102, and a network address translation (NAT) service card 120 ("NAT service card 120"). Forwarding engine 106 may receive packet forwarded via switch 118 from IFCs 112 and forward those packets via switch 118 and IFCs 112 on outbound links 116 according to forwarding information 110. In this manner, forwarding engine 106 provides the forwarding functionality of router 100.

Router 100 also includes above noted NAT service card 120. In some implementations, NAT service card 120 includes a module similar to central NAT management module 20. In this implementation, one or more distributed NAT modules similar to distributed NAT modules 22 described above may be executed by forwarding engine 106 and/or one or more of IFCs 112. In other implementations, NAT service card 120 includes a central NAT management module similar to central NAT management module 20 as well as a number of distributed NAT management modules similar to distributed NAT management modules 22. In this second exemplary implementation, the NAT service card may be referred to as a service plane entity in that it resides in a service plane separate from the routing and forwarding planes represented by routing engine 104 and forwarding engine 106, respectively. This service plane entity, which is commonly abbreviated as "SPE," may provide an interface by which one or more cards may be inserted into a chassis. Each of these cards may include one or more distributed NAT modules while the SPE executes the central NAT management module. Regardless of the implementation details, NAT service card 120 may implement the techniques described in this disclosure to enhance the application of NAT to packets with the potential result of improving the speed with which NAT may be performed.

To illustrate the flow of packets with respect to the exemplary configuration of router 100, assume router 100 replaces router 18 in the example of FIG. 1 and that one of IFCs 112, e.g., IFC 112A, may receive an outbound packet originated by one of end-user devices 16, e.g., end-user device 16A. IFC 112A forwards this packet to forwarding engine 106 via switch 118, where forwarding engine 106 forwards this packet to NAT service card 120. Although not shown in the example of FIG. 4, NAT service card 120 may also include a session allocation module similar to session allocation module 34 that forwards the packet to a determined one of the distributed NAT modules. Upon performing NAT in accordance with the techniques of this disclosure as described in more detail above, NAT service card 120 forwards the modified packet generated as a result of performing these techniques back to forwarding engine 106. Forwarding engine 106 then forwards this modified packet via an appropriate one of IFCs 112 as specified by forwarding information 110.

Various embodiments of the invention have been described. These and other embodiments are within the scope of the following claims.

The invention claimed is:

1. A method of allocating network resources for use in network address translation (NAT), the method comprising:
    storing, with one of the plurality of NAT modules executing in a network device, data defining a local pool of two or more unallocated NAT resources for use in performing network address translation but that have not yet been allocated for use in performing network address translation, wherein each of the NAT resources of the local pool of NAT resources includes a network address and a network port number;
    receiving, with the one of the plurality of NAT modules, a packet that includes a source address;
    determining, with the one of the plurality of NAT modules, whether any of the NAT resources from the local pool of NAT resources are available for use in obscuring the source address;
    in response to the determination that none of the NAT resources from the local pool of NAT resources are available for use in obscuring the source address, requesting, with the one of the plurality of NAT modules, one or more additional NAT resources for use in obscuring the source address;
    performing, with the one of the plurality of NAT modules, network address translation to obscure the source address of the packet using one of the one or more additional NAT resources to generate a modified packet; and
    forwarding, with the network device, the modified packet to a destination identified by a destination address specified within the modified packet.

2. The method of claim 1, further comprising:
    storing, with a central NAT management module executing within the network device, a central pool of NAT resources;

issuing a single request, with the one of a plurality of NAT modules executing in the network device, to the central NAT management module requesting that two or more of the NAT resources of the central pool of NAT resources be allocated to the one of the plurality of NAT modules;

receiving a response, with the one of the plurality of NAT modules, from the central NAT management module allocating the requested two or more of the NAT resources of the central pool of NAT resources to the one of the plurality of NAT modules;

wherein storing, with the one of the plurality of NAT modules, data defining a local pool of two or more unallocated NAT resources includes storing data defining the local pool of two or more unallocated NAT resources that include the two or more NAT resources allocated by the central NAT management module to the one of the plurality of NAT modules for use in performing network address translation but that have not yet been allocated for use in performing network address translation;

wherein requesting one or more additional NAT resources comprises requesting that the central NAT management module allocate a batch of two or more additional NAT resources from the central pool of NAT resources, wherein the method further comprises updating the local pool of NAT resources with the batch of two or more additional NAT resources to increase a number of NAT resources available to be allocated for use in obscuring the source address within the local pool, and wherein performing network address translation comprises performing network address translation to obscure the source address of the packet using one of the one or more additional NAT resources added to the updated local pool of NAT resources to generate the modified packet.

3. The method of claim 2, further comprising:

prior to requesting that the central NAT management module allocate the batch of two or more additional NAT resources, requesting, with the one of the plurality of NAT modules, that one of the remaining ones of the plurality of NAT modules allocate an additional NAT resource from a local pool of NAT resources stored by the one of the remaining ones of the plurality of NAT modules;

receiving a response from the one of the remaining ones of the plurality of NAT modules indicating that the one of the remaining ones of the plurality of NAT modules does not have any NAT resources in its local pool of NAT resources that are available for allocation to the one of the plurality of NAT modules, and wherein requesting one or more additional NAT resources comprises, only after receiving the response indicating that the one of the remaining ones of the plurality of NAT modules does not have any NAT resources in its local pool of NAT resources that are available for allocation to the one of the plurality of NAT modules, requesting that the central NAT management module allocate the batch of two or more additional NAT resources from the central pool of NAT resources.

4. The method of claim 2, further comprising:

prior to requesting that the central NAT management module allocate the batch of two or more additional NAT resources, issuing a request, with the one of the plurality of NAT modules, to one or more of the remaining ones of the plurality of NAT modules requesting that at least one of the one or more of the remaining ones of the plurality of NAT modules allocate an additional NAT resource from a local pool of NAT resources stored by the one of the remaining ones of the plurality of NAT modules, wherein requesting one or more additional NAT resources comprises, only after receiving from each of the one or more of the remaining ones of the plurality of NAT modules a response indicating that the each of the one or more of the remaining ones of the plurality of NAT modules does not have any NAT resources in its local pool of NAT resources that are available for allocation to the one of the plurality of NAT modules, requesting that the central NAT management module allocate the batch of two or more additional NAT resources from the central pool of NAT resources.

5. The method of claim 1, wherein requesting one or more additional NAT resources comprises requesting, with the one of the plurality of NAT modules, that one of the remaining ones of the plurality of NAT modules allocate an additional NAT resource from a local pool of NAT resources stored by the one of the remaining ones of the plurality of NAT modules, wherein the method further comprises updating the local pool of NAT resources with the one additional NAT resource allocated by the one of the remaining ones of NAT modules to increase a number of NAT resources available to be allocated for use in obscuring the source address within the local pool, and wherein performing network address translation comprises performing network address translation to obscure the source address of the packet using the additional NAT resources added to the updated local pool of NAT resources to generate the modified packet.

6. The method of claim 5, further comprising, concurrent to requesting that the one of the remaining ones of the plurality of NAT modules allocate the additional NAT resource from the local pool of NAT resources stored by the one of the remaining ones of the plurality of NAT modules, requesting that the central NAT management module allocate a batch of two or more additional NAT resources from the central pool of NAT resources.

7. The method of claim 5, further comprising:

storing, for each of the plurality of NAT modules, data defining a local pool of two or more unallocated NAT resources for use in performing network address translation but that have not yet been allocated for use in performing network address translation, including the local pool of two or more unallocated NAT resources for the one of the plurality of NAT modules; and statically allocating each of the local pools of two or more unallocated NAT resources prior to enabling the network device to begin receiving packets.

8. The method of claim 1, wherein the method further comprises, prior to determining whether any of the NAT resources from the local pool of NAT resources are available, determining, with the one of the plurality of NAT modules, whether one of the NAT resources from the pool of NAT resources has been previously allocated for use in obscuring the source address, wherein determining whether any of the NAT resources from the pool of NAT resources are available comprises, in response to the determination that none of the NAT resources from the pool of NAT resources has been previously allocated for use in obscuring the source address, determining, with the one of the plurality of NAT modules, whether any of the NAT resources from the pool of NAT resources are available for use in obscuring the source address.

9. The method of claim 1, further comprising:
determining a session to which the packet corresponds;
based on the determined session, determining whether any one of the plurality of NAT modules has been previously assigned to handle the session to which the packet corresponds;
in response to determining that this session has not been assigned to any one of the plurality of NAT modules, assigning the session to the one of the plurality of NAT modules; and
associating the session with the one of the one or more additional NAT resources used to obscure the source address of the packet.

10. The method of claim 9, further comprising:
after receiving the packet, receiving a subsequent packet;
determining that the subsequent packet also corresponds to the same session as the packet;
based on determining that the subsequent packet corresponds to the same session as the packet, forwarding the subsequent packet to the one of the plurality of NAT modules previously assigned to handle the session;
determining, with the one of the plurality of NAT modules, that the session to which the subsequent packet corresponds has been previously associated with the one of the one or more additional NAT resources; and
performing, with the one of the plurality of NAT modules, network address translation to obscure the source address of the subsequent packet using the same one of the one or more additional NAT resources used to obscure the source address of the packet to generate a modified subsequent packet.

11. The method of claim 1,
wherein the network device comprises a router that includes a control unit,
wherein the control unit is divided into a control plane, a data plane and a service plane, and
wherein the plurality of NAT modules execute within the data plane.

12. A network device comprising:
at least one interface card that receives a packet including a source address; and
a control unit that includes a plurality of NAT modules, wherein each of the plurality of NAT modules stores data defining a local pool of two or more unallocated NAT resources for use in performing network address translation but that have not yet been allocated for use in performing network address translation, wherein each of the NAT resources of the local pools of NAT resources includes a network address and a network port number;
wherein one of the plurality of NAT modules receives the packet, determines whether any of the NAT resources from the local pool of NAT resources are available for use in obscuring the source address of the packet, in response to the determination that none of the NAT resources from the local pool of NAT resources are available for use in obscuring the source address, requests one or more additional NAT resources for use in obscuring the source address, and performs network address translation to obscure the source address of the packet using one of the one or more additional NAT resources to generate a modified packet,
wherein the at least one interface card forwards the modified packet to a destination identified by a destination address specified within the modified packet.

13. The network device of claim 12,
wherein the control unit further comprises a central NAT management module that stores a central pool of NAT resources, wherein each of the NAT resources of the central pool of NAT resources includes a network address and a network port number, and
wherein the one of the plurality of NAT modules issuing a single request to the central NAT management module requesting that two or more of the NAT resources of the central pool of NAT resources be allocated to the one of the plurality of NAT modules and receives a response from the central NAT management module allocating the requested two or more of the NAT resources of the central pool of NAT resources to the one of the plurality of NAT modules, stores the data defining the local pool of two or more unallocated NAT resources such that the local pool of NAT resources includes the two or more NAT resources allocated by the central NAT management module to the one of the plurality of NAT modules for use in performing network address translation but that have not yet been allocated for use in performing network address translation, requests that the central NAT management module allocate a batch of two or more additional NAT resources from the central pool of NAT resources, updates the local pool of NAT resources with the batch of two or more additional NAT resources to increase a number of NAT resources available to be allocated for use in obscuring the source address within the local pool, and performs network address translation to obscure the source address of the packet using one of the one or more additional NAT resources added to the updated local pool of NAT resources to generate the modified packet.

14. The network device of claim 13, wherein the one of the plurality of NAT modules, prior to requesting that the central NAT management module allocate the batch of two or more additional NAT resources, requests that one of the remaining ones of the plurality of NAT modules allocate an additional NAT resource from a local pool of NAT resources stored by the one of the remaining ones of the plurality of NAT modules, receives a response from the one of the remaining ones of the plurality of NAT modules indicating that the one of the remaining ones of the plurality of NAT modules does not have any NAT resources in its local pool of NAT resources that are available for allocation to the one of the plurality of NAT modules, and, only after receiving the response indicating that the one of the remaining ones of the plurality of NAT modules does not have any NAT resources in its local pool of NAT resources that are available for allocation to the one of the plurality of NAT modules, requests that the central NAT management module allocate the batch of two or more additional NAT resources from the central pool of NAT resources.

15. The network device of claim 13, wherein the one of the plurality of NAT modules, prior to requesting that the central NAT management module allocate the batch of two or more additional NAT resources, issues a request to one or more of the one of the remaining ones of the plurality of NAT modules requesting that at least one of the one or more of the remaining ones of the plurality of NAT modules allocate an additional NAT resource from a local pool of NAT resources stored by the one of the remaining ones of the plurality of NAT modules, and, only after receiving from each of the one or more of the remaining ones of the plurality of NAT modules a response indicating that the each of the one or more of the remaining ones of the plurality of NAT modules does not have any NAT resources in its local pool of NAT resources that are available for allocation to the one of the plurality of NAT modules, requests that the central NAT management module allocate the batch of two or more additional NAT resources from the central pool of NAT resources.

16. The network device of claim 12, wherein the one of the plurality of NAT modules requests that one of the remaining ones of the plurality of NAT modules allocate an additional NAT resource from a local pool of NAT resources stored by the one of the remaining ones of the plurality of NAT modules, updates the local pool of NAT resources with the one additional NAT resource allocated by the one of the remaining ones of NAT modules to increase a number of NAT resources available to be allocated for use in obscuring the source address within the local pool, and performs network address translation to obscure the source address of the packet using the additional NAT resources added to the updated local pool of NAT resources to generate the modified packet.

17. The network device of claim 16,
wherein the control unit further comprises a central NAT management module that stores a central pool of NAT resources, wherein each of the NAT resources of the central pool of NAT resources includes a network address and a network port number, and
wherein the one of the plurality of NAT modules, concurrent to requesting that the one of the remaining ones of the plurality of NAT modules allocate the additional NAT resource from the local pool of NAT resources stored by the one of the remaining ones of the plurality of NAT modules, requests that the central NAT management module allocate a batch of two or more additional NAT resources from the central pool of NAT resources.

18. The network device of claim 16,
wherein each of the plurality of NAT modules stores data defining a local pool of two or more unallocated NAT resources for use in performing network address translation but that have not yet been allocated for use in performing network address translation, including the local pool of two or more unallocated NAT resources for the one of the plurality of NAT modules, and
wherein each of the local pools of two or more unallocated NAT resources is statically allocated prior to enabling the network device to begin receiving packets.

19. The network device of claim 12,
wherein the one of the plurality of NAT modules, prior to determining whether any of the NAT resources from the local pool of NAT resources are available, determines whether one of the NAT resources from the pool of NAT resources has been previously allocated for use in obscuring the source address, and, in response to the determination that none of the NAT resources from the pool of NAT resources has been previously allocated for use in obscuring the source address, determines whether any of the NAT resources from the pool of NAT resources are available for use in obscuring the source address.

20. The network device of claim 12, wherein the control unit further comprises a session allocation module that determines a session to which the packet corresponds, based on the determined session, determines whether any one of the plurality of NAT modules has been previously assigned to handle the session to which the packet corresponds, in response to determining that this session has not been assigned to any one of the plurality of NAT modules, assigns the session to the one of the plurality of NAT modules, and associates the session with the one of the one or more additional NAT resources used to obscure the source address of the packet.

21. The network device of claim 20, wherein the session allocation module, after receiving the packet, receives a subsequent packet, determines that the subsequent packet also corresponds to the same session as the packet, based on determining that the subsequent packet corresponds to the same session as the packet, and forwards the subsequent packet to the one of the plurality of NAT modules previously assigned to handle the session,
wherein the one of the plurality of NAT modules determines that the session to which the subsequent packet corresponds has been previously associated with the one of the one or more additional NAT resources and performs network address translation to obscure the source address of the subsequent packet using the same one of the one or more additional NAT resources used to obscure the source address of the packet to generate a modified subsequent packet.

22. The network device of claim 12,
wherein the network device comprises a router,
wherein the control unit is divided into a control plane, a data plane and a service plane, and
wherein the plurality of NAT modules execute within the data plane.

23. A non-transitory computer-readable storage medium comprising instructions that cause a processor of a network device to:
store data defining a local pool of two or more unallocated NAT resources for use in performing network address translation but that have not yet been allocated for use in performing network address translation, wherein each of the NAT resources of the local pool of NAT resources includes a network address and a network port number;
receive a packet that includes a source address;
determine whether any of the NAT resources from the local pool of NAT resources are available for use in obscuring the source address;
in response to the determination that none of the NAT resources from the local pool of NAT resources are available for use in obscuring the source address, request one or more additional NAT resources for use in obscuring the source address;
perform network address translation to obscure the source address of the packet using one of the one or more additional NAT resources to generate a modified packet; and
forward the modified packet to a destination identified by a destination address specified within the modified packet.

24. The non-transitory computer-readable medium of claim 23, further comprising instructions that cause the processor to:
store a central pool of NAT resources;
issue a single request to a central NAT management module that maintains the central pool of NAT resources, where the request requests that two or more of the NAT resources of the central pool of NAT resources be allocated to the local pool of NAT resources;
receive a response from the central NAT management module allocating the requested two or more of the NAT resources of the central pool of NAT resources to the local pool of NAT resources;
store data defining the local pool of two or more unallocated NAT resources that include the two or more NAT resources allocated by the central NAT management module to the one of the plurality of NAT modules for use in performing network address translation but that have not yet been allocated for use in performing network address translation;

request that the central NAT management module allocate a batch of two or more additional NAT resources from the central pool of NAT resources;

update the local pool of NAT resources with the batch of two or more additional NAT resources to increase a number of NAT resources available to be allocated for use in obscuring the source address within the local pool; and perform network address translation to obscure the source address of the packet using one of the one or more additional NAT resources added to the updated local pool of NAT resources to generate the modified packet.

25. The non-transitory computer-readable medium of claim 23, further comprising instructions that cause the processor to:

store a plurality of local pools of NAT resources, wherein the plurality of local pools of NAT resources includes the local pool of NAT resources as one of the plurality of local pools of NAT resources;

request an additional NAT resource be allocated to the one of the plurality of local pools of NAT resources from one of the remaining ones of the plurality of local pools of NAT resources;

update the one of the plurality of local pools of NAT resources with the one additional NAT resource allocated by the one of the remaining ones of the plurality of local pools of NAT resources to increase a number of NAT resources available to be allocated for use in obscuring the source address within the local pool; and perform network address translation to obscure the source address of the packet using the additional NAT resources added to the updated one of the plurality of local pools of NAT resources to generate the modified packet.

26. A network system comprising:

a public network; and a private network that includes:

a plurality of end-user devices; and a router positioned intermediate to the plurality of end-user devices and the public network, wherein the router receives all network traffic originated by the plurality of end-user devices that is destined for the public network, and wherein the router includes:

at least one interface card that receives a packet including a source address; and a control unit that includes a plurality of NAT modules, wherein each of the plurality of NAT modules stores data defining a local pool of two or more unallocated NAT resources for use in performing network address translation but that have not yet been allocated for use in performing network address translation, wherein one of the plurality of NAT modules receives the packet, determines whether any of the NAT resources from the local pool of NAT resources are available for use in obscuring the source address of the packet, in response to the determination that none of the NAT resources from the local pool of NAT resources are available for use in obscuring the source address, requests one or more additional NAT resources for use in obscuring the source address, and performs network address translation to obscure the source address of the packet using one of the one or more additional NAT resources to generate a modified packet, and wherein the at least one interface card forwards the modified packet to a destination identified by a destination address specified within the modified packet.

27. A method of allocation network resources for use in network address translation (NAT), the method comprising:

storing, with the one of the plurality of NAT modules, data statically defining an initial local pool of two or more unallocated NAT resources for use in performing network address translation but that have not yet been allocated for use in performing network address translation;

receiving, with the one of the plurality of NAT modules, a packet that includes a source address;

determining, with the one of the plurality of NAT modules, whether any of the NAT resources from the initial local pool of NAT resources are available for use in obscuring the source address;

in response to the determination that none of the NAT resources from the initial local pool of NAT resources are available for use in obscuring the source address, requesting, with the one of the plurality of NAT modules, that one of the remaining ones of the plurality of NAT modules allocate an additional NAT resource from a local pool of NAT resources stored by the one of the remaining ones of the plurality of NAT modules;

updating the initial local pool of NAT resources with the one additional NAT resource allocated by the one of the remaining ones of NAT modules to increase a number of NAT resources available to be allocated for use in obscuring the source address within the local pool;

performing, with the one of the plurality of NAT modules, network address translation to obscure the source address of the packet using the additional NAT resources added to the updated initial local pool of NAT resources to generate the modified packet; and forwarding, with the network device, the modified packet to a destination identified by a destination address specified within the modified packet.

\* \* \* \* \*